United States Patent
Kitano et al.

(10) Patent No.: US 10,615,704 B2
(45) Date of Patent: Apr. 7, 2020

(54) INVERTER WITH REDUCED OUTPUT RIPPLE

(71) Applicant: DAIKIN INDUSTRIES, LTD., Osaka-shi, Osaka (JP)

(72) Inventors: Nobuki Kitano, Osaka (JP); Tatsuki Inoue, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/337,773

(22) PCT Filed: Jun. 20, 2017

(86) PCT No.: PCT/JP2017/022643
§ 371 (c)(1),
(2) Date: Mar. 28, 2019

(87) PCT Pub. No.: WO2018/061342
PCT Pub. Date: Apr. 5, 2018

(65) Prior Publication Data
US 2020/0007049 A1    Jan. 2, 2020

(30) Foreign Application Priority Data

Sep. 30, 2016    (JP) .................................. 2016-192656

(51) Int. Cl.
*H02P 21/05*    (2006.01)
*H02M 5/458*    (2006.01)
(Continued)

(52) U.S. Cl.
CPC ........... *H02M 5/458* (2013.01); *H02M 1/126* (2013.01); *H02M 1/14* (2013.01); *H02M 7/5387* (2013.01);
(Continued)

(58) Field of Classification Search
CPC . H02M 1/15; H02M 1/14; H02P 21/05; H02P 27/08
See application file for complete search history.

(56) References Cited

U.S. PATENT DOCUMENTS

| 5,481,451 A | 1/1996 | Kuwahara |
| 2006/0215429 A1 | 9/2006 | Oka et al. |

(Continued)

FOREIGN PATENT DOCUMENTS

| JP | 60-187264 A | 9/1985 |
| JP | 61-48356 B2 | 10/1986 |

(Continued)

OTHER PUBLICATIONS

International Preliminary Report of corresponding PCT Application No. PCT/JP2017/022643 dated Apr. 11, 2019.
(Continued)

*Primary Examiner* — Harry R Behm
(74) *Attorney, Agent, or Firm* — Global IP Counselors, LLP

(57) ABSTRACT

An inverter device includes a converter section, an inverter section, and a control device. The converter section full-wave rectifies a three-phase AC voltage and outputs a DC voltage including a ripple component having a frequency six times the frequency of the three-phase AC voltage. The inverter section converts the DC voltage including the ripple component from the converter section into an AC voltage and outputs the AC voltage to a motor. The control device, in a rotating coordinate in which an N-pole direction of a permanent magnet embedded in a rotor of the motor is taken as a d-axis and a direction orthogonal to the d-axis is taken as a q-axis, controls the inverter section so that a phase of a d-axis voltage Vd of the ripple component included in the DC voltage leads a phase of a q-axis voltage Vq.

12 Claims, 10 Drawing Sheets

(51) Int. Cl.
    *H02P 21/22* (2016.01)
    *H02M 1/12* (2006.01)
    *H02M 1/14* (2006.01)
    *H02M 7/5387* (2007.01)
    *H02M 1/00* (2006.01)
(52) U.S. Cl.
    CPC ..... *H02P 21/22* (2016.02); *H02M 2001/0022* (2013.01); *H02P 21/05* (2013.01)

(56) References Cited

U.S. PATENT DOCUMENTS

| | | | |
|---|---|---|---|
| 2007/0005194 A1* | 1/2007 | Chang | G01R 19/2513 700/292 |
| 2011/0043150 A1* | 2/2011 | Ogawa | H02M 5/458 318/400.26 |
| 2013/0300334 A1 | 11/2013 | Tooyama et al. | |
| 2014/0232309 A1 | 8/2014 | Zhou et al. | |

FOREIGN PATENT DOCUMENTS

| | | |
|---|---|---|
| JP | 6-153534 A | 5/1994 |
| JP | 2006-271095 A | 10/2006 |
| JP | 2013-85455 A | 5/2013 |
| WO | 2012/098875 A1 | 7/2012 |

OTHER PUBLICATIONS

International Search Report dated Jul. 25, 2017 in corresponding International Application No. PCT/JP2017/022643, filed Jun. 20, 2017 (with English Translation).

* cited by examiner

INVERTER WITH REDUCED OUTPUT RIPPLE

TECHNICAL FIELD

The present invention relates to an inverter device.

BACKGROUND ART

A general three-phase inverter device smoothes out voltage ripple occurring in a diode bridge by providing a capacitor and a reactor in a smoothing circuit. However, a large capacitor and a large reactor are required to smooth out voltage ripple, which raises a problem of increase in cost and volume.

When the sizes of the capacitor and the reactor are reduced in such an inverter device, the above problem is solved, but a DC voltage pulsates. The pulsation of the DC voltage causes ripple and beat in a motor current.

As illustrated in FIG. 4, it is known that when there is ripple in a DC link voltage, a specific command frequency of an inverter device causes undulation (beat) of low-frequency components in a motor phase current.

In the case of an inverter device not using an electrolytic capacitor for smoothing, the largest frequency component generated in the DC link voltage is six times the power source frequency (300 Hz at 50 Hz, 360 Hz at 60 Hz), and when the number of motor pole pairs is three, the beat phenomenon becomes most prominent around 100 rps (300 Hz) or 120 rps (360 Hz).

Such a beat phenomenon causes problems such as increase in the rms value and peak current, and vibration of the motor. Hence, a technique for suppressing beat is necessary.

A conventional inverter device detects ripple in a DC link voltage and corrects the voltage, so that a voltage according to a voltage command is applied from the inverter device to a motor to suppress beat (for example, refer to JP S61-48356 B. As a result, ripple in the voltage applied to the motor is suppressed, and ripple and beat in the motor current are suppressed.

SUMMARY

However, in the case of the above conventional inverter device, since the modulation factor is corrected so as to eliminate ripple in the voltage applied to the motor, the voltage can only be utilized by 86.6% (see FIG. 4) of the maximum value of the DC link voltage. Accordingly, the voltage utilization factor decreases and the motor current rms value increases.

Hence, in order to increase the voltage utilization factor, for example, the modulation factor is set to the maximum possible modulation factor. In this case, although the voltage utilization factor increases, the motor output voltage pulsates, and therefore problems such as ripple and beat in the motor current occur.

In order to improve the voltage utilization factor of an inverter device not using an electrolytic capacitor for smoothing, the modulation factor is set to the maximum possible modulation factor, whereby the voltage applied to the motor pulsates according to the DC voltage. However, ripple and beat occur in the motor current according to the voltage ripple of the motor.

It is therefore an object of the present invention to provide an inverter device capable of suppressing ripple and beat in a motor current without lowering the voltage utilization factor.

In order to solve the above problems, an inverter device of one aspect of the invention includes:

a converter section that full-wave rectifies a three-phase AC voltage and outputs a DC voltage including a ripple component having a frequency six times a frequency of the three-phase AC voltage;

an inverter section that converts the DC voltage including the ripple component from the converter section into an AC voltage and outputs the AC voltage to a motor; and a control device that, in a rotating coordinate in which an N-pole direction of a permanent magnet embedded in a rotor of the motor is taken as a d-axis and a direction orthogonal to the d-axis is taken as a q-axis, controls the inverter section so that a phase of a d-axis voltage Vd of the ripple component included in the DC voltage leads a phase of a q-axis voltage Vq.

According to the above configuration, in a rotating coordinate in which the N-pole direction of a permanent magnet embedded in a rotor of the motor is taken as the d-axis and a direction orthogonal to the d-axis is taken as the q-axis, the control device controls the inverter section so that the phase of the d-axis voltage Vd of the ripple component included in the DC voltage from the converter section leads the phase of the q-axis voltage Vq, whereby it is possible to control the phase of the output voltage to the motor according to ripple in the output voltage to the motor without lowering voltage utilization factor, and it is possible to suppress ripple and beat in the motor current.

Further, in the inverter device of one aspect, the control device (100) controls the inverter section so that the phase of the d-axis voltage Vd of the ripple component included in the DC voltage leads the phase of the q-axis voltage Vq by 90 degrees in the rotating coordinate.

According to the above aspect, the control device controls the inverter section so that the phase of the d-axis voltage Vd of the ripple component included in the DC voltage from the converter section leads the phase of the q-axis voltage Vq by 90 degrees in the rotating coordinate, whereby it is possible to effectively suppress ripple and beat in the motor current.

Further, in the inverter device of one aspect, the control device includes:

a phase detector that detects a phase of the three-phase AC voltage;

a ripple component phase determination unit that determines a phase of the ripple component, included in the DC voltage, based on the phase of the three-phase AC voltage detected by the phase detector; and an output voltage phase correction unit that corrects a phase of an output voltage output from the inverter section based on the phase of the ripple component, included in the DC voltage, determined by the ripple component phase determination unit, so that the phase of the d-axis voltage Vd of the ripple component included in the DC voltage leads the phase of the q-axis voltage Vq by 90 degrees.

According to the above aspect, the phase of the ripple component included in the DC voltage is determined by the ripple component phase determination unit based on the phase of the three-phase AC voltage detected by the phase detector. Hence, it is possible to detect the phase of the ripple component with a simple configuration. Based on the determined phase of the ripple component included in the DC voltage, the output voltage phase correction unit corrects the phase of the output voltage output from the inverter section so that the phase of the d-axis voltage Vd of the ripple component included in the DC voltage leads the phase of the q-axis voltage Vq by 90 degrees. Hence, it is possible to reliably suppress ripple and beat in the motor current.

Further, in the inverter device of one aspect, the control device controls the inverter section so that a locus of a voltage vector on the d and q axes of the rotating coordinate of an output voltage output from the inverter section (22) becomes circular.

According to the above aspect, by controlling the inverter section by the control device so that the locus of the voltage vector on the d and q axes of the rotating coordinate of the output voltage output from the inverter section becomes circular, it is possible to reliably suppress ripple and beat in the motor current.

Further, in the inverter device of one aspect, the output voltage phase correction unit includes:

a first output voltage phase correction unit that corrects a phase of an output voltage output from the inverter section (22) so that the phase of the d-axis voltage Vd of the ripple component having the frequency six times the frequency of the three-phase AC voltage leads the phase of the q-axis voltage Vq by 90 degrees; and second to Nth output voltage phase correction units that correct respective phases of the output voltage output from the inverter section (22) so that the phase of the d-axis voltage Vd of the ripple component having a frequency of 6N times (N=2, 3, . . . , m (m is a positive integer)) the frequency of the three-phase AC voltage leads the phase of the q-axis voltage Vq by 90 degrees.

According to the above aspect, it is possible to suppress ripple and beat in the motor current not only for the ripple component having a frequency six times the frequency of the three-phase AC voltage, but also for harmonic components of integral multiples of the ripple component having the sextuple frequency, by controlling the phase of the output voltage output from the inverter section so that the phase of the d-axis voltage Vd of the harmonic component of the integral multiple of the ripple component having the sextuple frequency leads the phase of the q-axis voltage Vq by 90 degrees, in a rotating coordinate in which a direction orthogonal to the d-axis is taken as the q-axis.

Further, the inverter device of one aspect also includes an LC filter that has a reactor connected to one of two output ends of the converter section and one of two input ends of the inverter section, and a capacitor connected between the input ends of the inverter section. A characteristic of the LC filter is set so that a resonance frequency of the LC filter is a frequency equal to or more than six times a commercial frequency of the three-phase AC voltage input into the converter section, and is a frequency that attenuates a current having the same frequency as a carrier frequency of the inverter section.

According to the above aspects, a large capacitor and a large reactor for smoothing need not be provided in a DC link portion, whereby cost and size can be reduced.

As is apparent from the above, the invention can implement an inverter device capable of reducing ripple in a motor current when a DC link voltage pulsates due to the power source frequency.

As a result, it is possible to make best use of the voltage, whereby the voltage utilization factor is improved and the motor current is reduced.

It is also possible to suppress ripple and beat in current, so that peak current and the current rms value can be reduced.

Furthermore, a large capacitor and a large reactor for smoothing need not be provided in a DC link portion, and the current capacity of each component can be reduced. Hence, it is possible to reduce cost.

DESCRIPTION OF EMBODIMENTS

Hereinafter, an inverter device of the invention will be described in detail with reference to the illustrated embodiments.

First Embodiment

Figure 1:
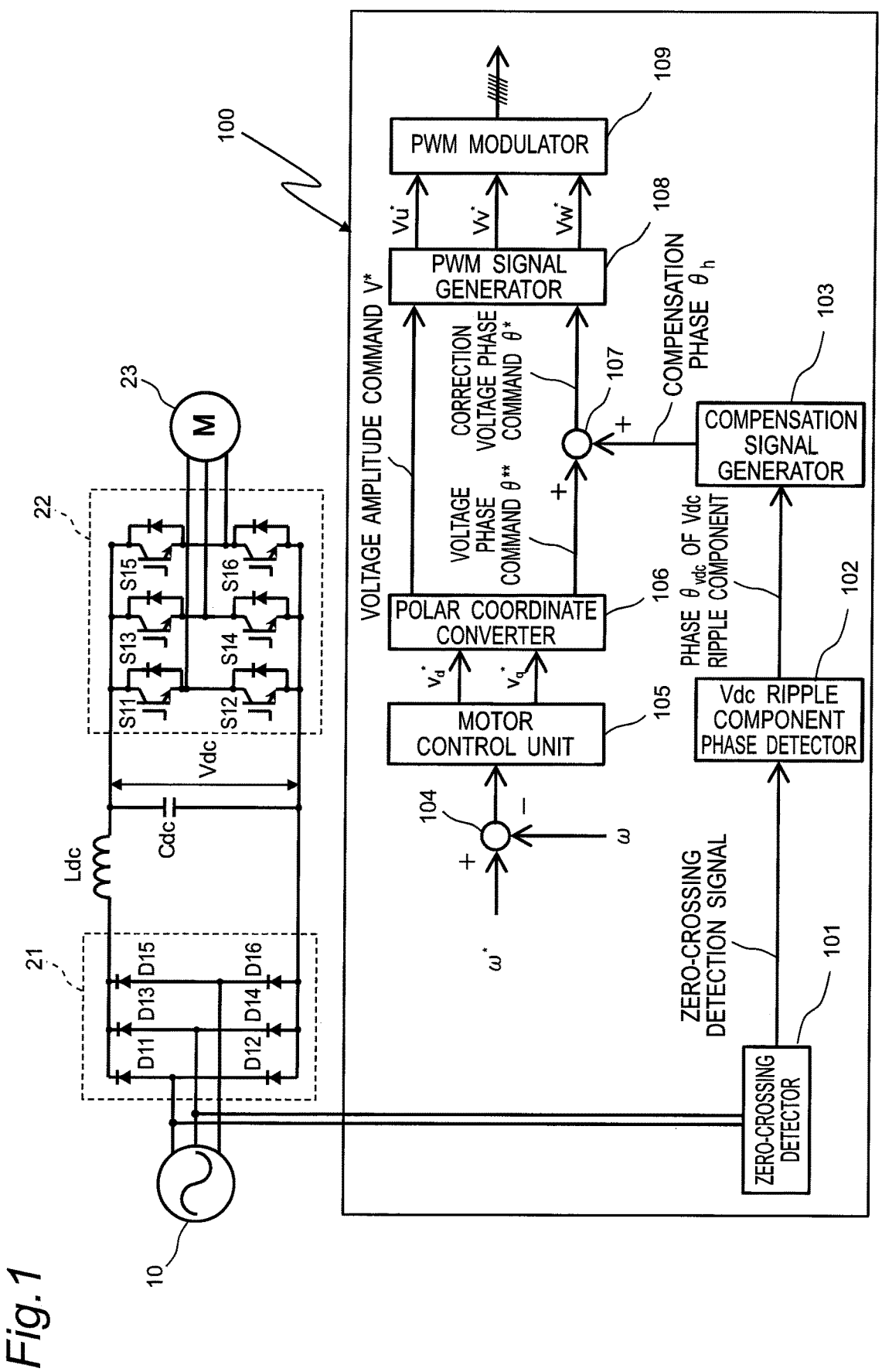
FIG. 1 is a configuration diagram of an inverter device of a first embodiment of the invention.

FIG. 1 is a configuration diagram of an inverter device of a first embodiment of the invention.

As illustrated in FIG. 1, the inverter device of the first embodiment includes a converter section 21 including six diodes D11 to D16 that form a three-phase diode bridge circuit, an inverter section 22 including six switching elements S11 to S16 that form a three-phase bridge circuit, and a control device 100 that controls the inverter section 22. The inverter device also includes an inductor Ldc connected between a positive output end of the converter section 21 and a positive input end of the inverter section 22, and a capacitor Cdc connected between the input ends of the inverter section 22. The inductor Ldc and the capacitor Cdc form an LC filter. The converter section 21 rectifies a three-phase AC voltage from a three-phase AC power source 10 into DC, and the inverter section 22 converts the rectified DC voltage into a desired three-phase AC voltage to output the three-phase AC voltage to a motor 23.

The control device 100 includes: a zero-crossing detector 101 that detects zero-crossing of a line voltage of the three-phase AC voltage; a Vdc ripple component phase detector 102 that outputs a signal indicating a phase $\theta_{Vdc}$ of a Vdc ripple component based on a zero-crossing signal; a compensation signal generator 103 that outputs a compensation signal $\theta_h$ based on the signal indicating the phase $\theta_{Vdc}$ of the Vdc ripple component from the Vdc ripple component phase detector 102; an adder-subtractor 104 that subtracts an actual speed $\omega$ from a speed command $\omega^*$; a motor control unit 105 that outputs voltage commands $v_d^*$, $v_q^*$ based on a signal from the adder-subtractor 104; a polar coordinate converter 106 that converts the voltage commands $v_d^*$, $v_q^*$ from the motor control unit 105 into polar coordinates; an adder-subtractor 107 that adds a voltage phase command $\theta^{**}$ from the polar coordinate converter 106 and the compensation signal $\theta_h$ from the compensation signal generator 103; a pulse width modulation (PWM) signal generator 108 that outputs phase voltage command signals Vu*, Vv*, Vw* based on a correction voltage phase command $\theta^*$ from the adder-subtractor 107 and a voltage amplitude command V* from the polar coordinate converter 106; and a PWM modulator 109 that outputs a PWM control signal to the switching elements S11 to S16 of the inverter section 22 based on the phase voltage command signals Vu*, Vv*, Vw* from the PWM signal generator 108.

The zero-crossing detector 101 outputs a zero-crossing signal indicating zero-crossing of an AC waveform based on the line voltage of the three-phase AC voltage from the three-phase AC power source 10. The zero-crossing detector 101 is an example of a phase detector.

Figure 2:
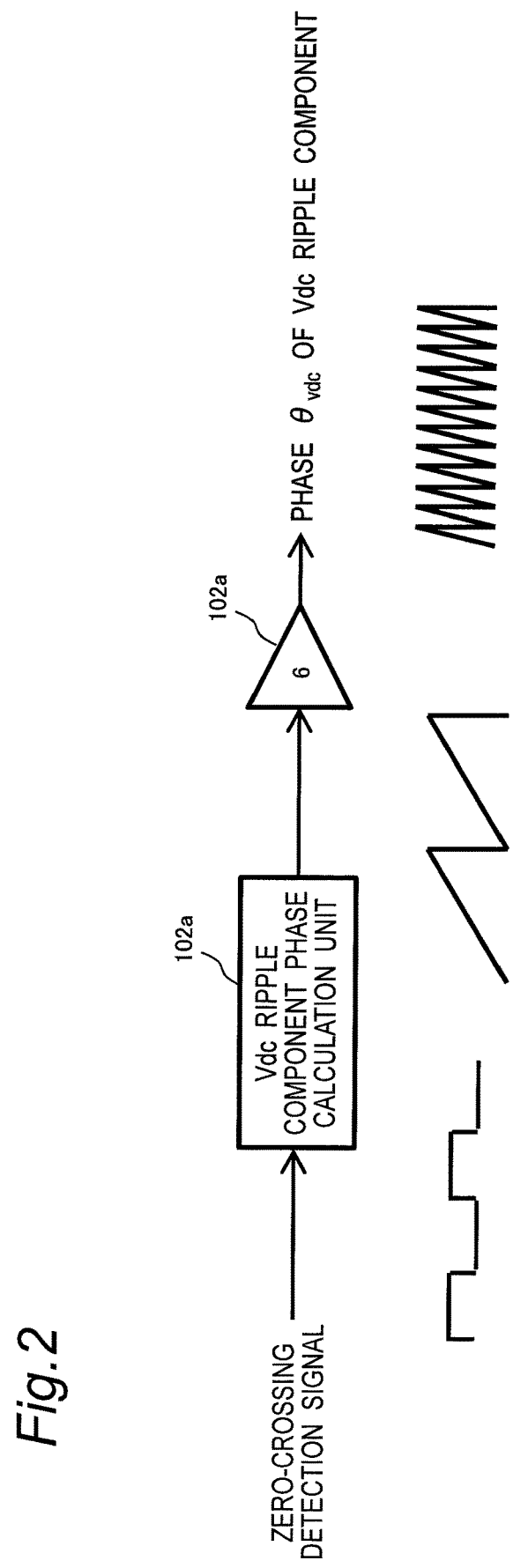
FIG. 2 is a configuration diagram of a Vdc ripple component phase detector of the inverter device.

As illustrated in FIG. 2, the Vdc ripple component phase detector 102 includes: a Vdc ripple component phase calculation unit 102a that outputs a triangular wave synchronized with the zero-crossing signal (rectangular wave) from the zero-crossing detector 101 based on the zero-crossing signal; and a multiplier 102b that multiplies a signal indicating the Vdc ripple component from the Vdc ripple component phase calculation unit 102a by 6 and outputs a signal indicating the phase $\theta_{Vdc}$ of the Vdc ripple component. The Vdc ripple component phase detector 102 is an example of a ripple component phase determination unit.

Figure 3:
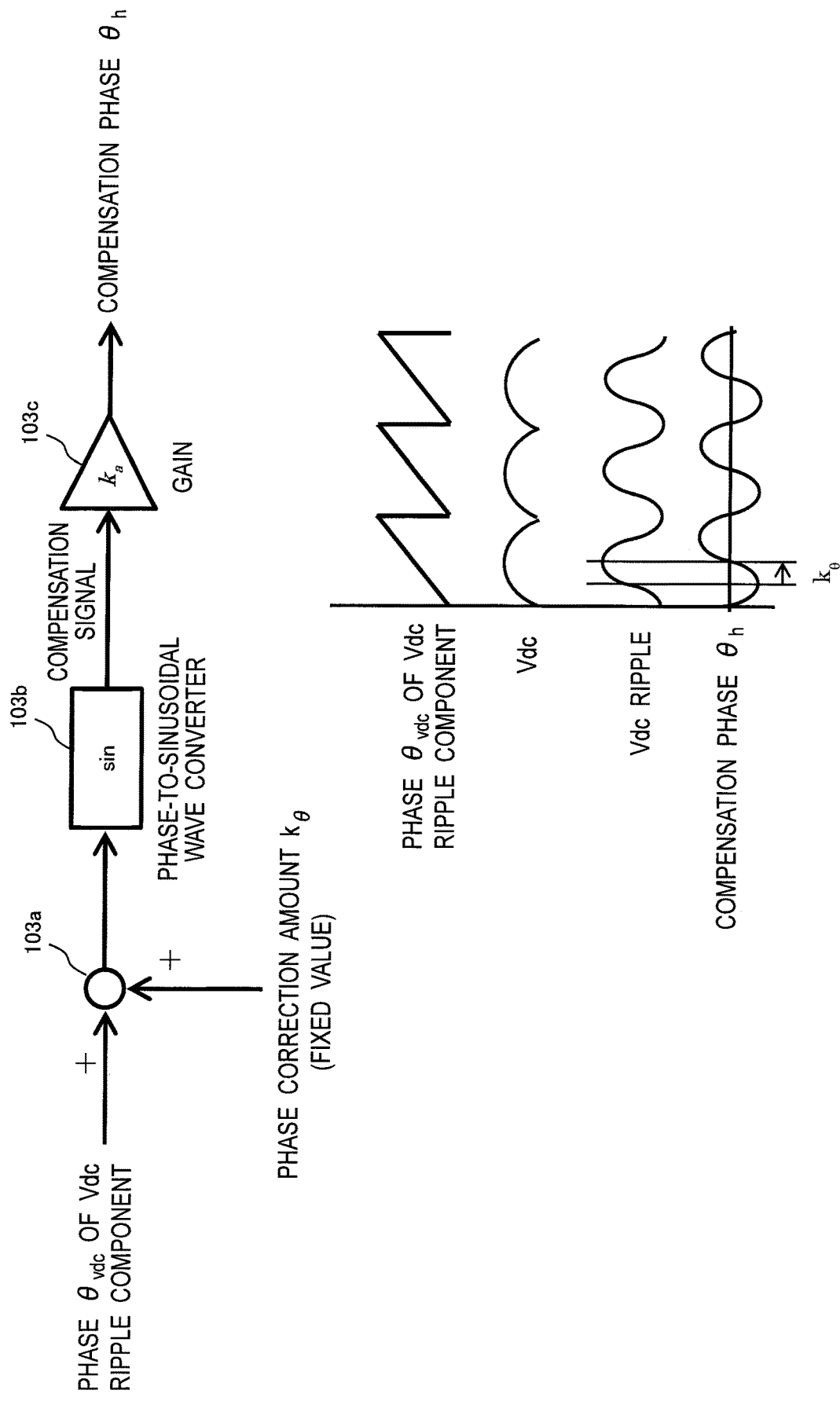
FIG. 3 is a configuration diagram of a compensation signal generator of the inverter device.
Figure 4:
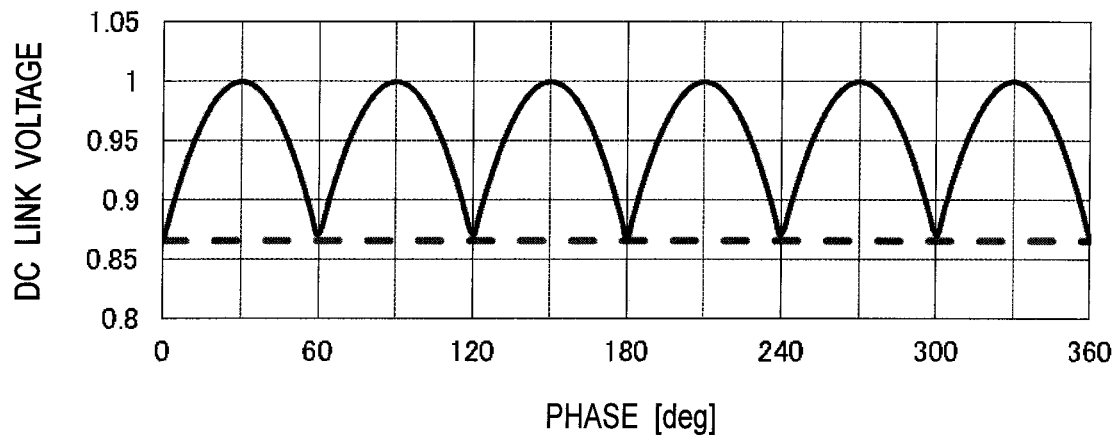
FIG. 4 is a diagram of a ripple waveform of a DC link voltage of the inverter device.

As illustrated in FIG. 3, the compensation signal generator 103 includes: an adder-subtractor 103a that adds the signal indicating the phase $\theta_{Vdc}$ of the Vdc ripple component from the Vdc ripple component phase detector 102 and a phase correction amount $k_\theta$ (fixed value); a phase-to-sinusoidal wave converter 103b that converts the signal, to which the phase correction amount $k_\theta$ is added by the adder-subtractor 103a, into a sine wave; and a multiplication device 103c that corrects the gain of the compensation signal from the phase-to-sinusoidal wave converter 103b and outputs a compensation signal $\theta_h$. Here, a gain correction amount $k_a$ of the multiplication device 103c is a fixed value. The compensation signal generator 103 is an example of an output voltage phase correction unit.

The lower side of FIG. 3 is a diagram of a waveform of the phase $\theta_{Vdc}$ of the Vdc ripple component, a Vdc waveform, a waveform of Vdc ripple, and a waveform of the compensation signal $\theta_h$.

Note that the characteristics of the LC filter are set so that the resonance frequency of the LC filter may be a frequency equal to or more than six times the commercial frequency of the three-phase AC voltage input into the converter section 21, and may be a frequency that attenuates a current having the same frequency as the carrier frequency of the inverter section 22. That is, the LC filter has no effect of smoothing the commercial frequency component.

<Beat Occurrence Principle>

It is known that the voltage equation of the motor on the d and q coordinate can be expressed by following Equation (1):

$$\begin{bmatrix} v_d \\ v_q \end{bmatrix} = \begin{bmatrix} R_a + \frac{d}{dt}L_d & -\omega_{er}L_q \\ \omega_{er}L_d & R_a + \frac{d}{dt}L_q \end{bmatrix} \begin{bmatrix} i_d \\ i_q \end{bmatrix} + \begin{bmatrix} 0 \\ \omega_{er}\Lambda_a \end{bmatrix} \quad (1)$$

where vd is a d-axis voltage, vq is a q-axis voltage, id is a d-axis current, iq is a q-axis current, Ld is d-axis inductance, Lq is q-axis inductance, Ra is a motor winding resistance, $\Lambda_a$ is a permanent magnet armature flux linkage, and $\omega_{er}$ is an electric angular velocity.

Ignoring the steady-state term $\omega_{er}\Lambda_a$ (voltage induced by magnetic flux of magnet) and transforming Equation (1) as a frequency transfer function, following Equation (2) is obtained.

$$\begin{bmatrix} I_d(j\omega) \\ I_q(j\omega) \end{bmatrix} = \frac{1}{G(j\omega)} \begin{bmatrix} R_a + j\omega L_q & \omega_{er}L_q \\ -\omega_{er}L_d & R_a + j\omega L_d \end{bmatrix} \begin{bmatrix} V_d(j\omega) \\ V_q(j\omega) \end{bmatrix} \quad (2)$$

$$G(j\omega) = L_d L_q(\omega_{er}^2 - \omega^2) + j\omega R_a(L_d + L_q) + R_a^2$$

Figure 10:
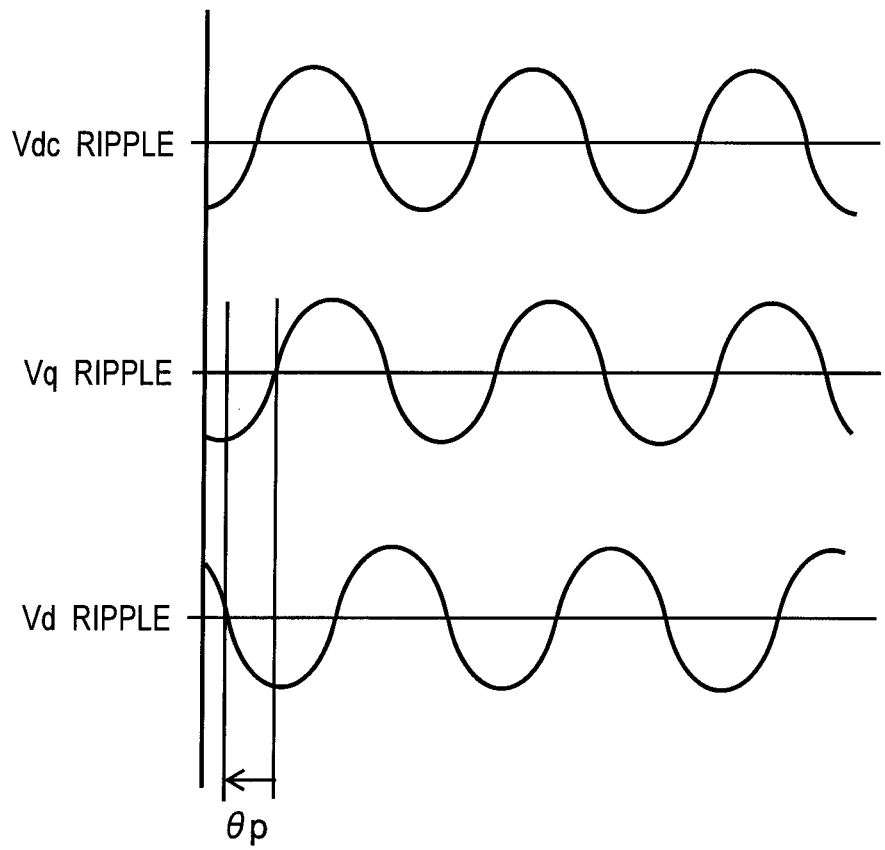
FIG. 10 is a diagram for describing a relationship between Vq ripple and Vd ripple with respect to Vdc ripple.

When voltage ripple of the DC link voltage is used as it is, Vd and Vq of Equation (2) also pulsate. Here, FIG. 10 is a diagram of the relationship between the Vq ripple and the Vd ripple with respect to the Vdc ripple, and $\theta p$ indicates the phase difference between the Vd ripple and the Vq ripple. As an example, in FIG. 10, a case where $\theta p = 90$ degrees (Vd leads Vq by 90 degrees) is illustrated.

Meanwhile, G(jw) included in the denominator of Equation (2) is minimized (=1/G(jw) maximum) when $\omega_{er}=\omega$, and ripple in the currents Id, Iq is maximized (current ripple and beat occur)

Here, $\omega$ denotes the ripple frequency of Vd and Vq. Therefore, when the input AC voltage is three-phase 50 Hz, for example, the main ripple frequency of Vd and Vq is 50×6=300 Hz.

When the number of pole pairs of the motor 23 is three, the number of revolutions of the motor is 100 rps at 300 Hz. Hence, beat becomes the largest at this time.

Vd and Vq are defined as a constant phase as illustrated in following Equation (3).

$$\begin{bmatrix} V_d(j\omega) \\ V_q(j\omega) \end{bmatrix} = V_{amp}(j\omega) \begin{bmatrix} -\sin\phi \\ \cos\phi \end{bmatrix} \quad (3)$$

Then, when $$\omega = \omega_{dc} = 2\pi \times 300 \text{ [rad/s]},$$

Equation (3) is a function related to $\omega_{er}$ as illustrated in following Equation (4).

$$\begin{bmatrix} I_d \\ I_q \end{bmatrix} = \frac{V_{amp300\,Hz}}{G} \begin{bmatrix} R_a + j\omega_{dc}L_q & \omega_{er}L_q \\ -\omega_{er}L_d & R_a + j\omega_{dc}L_d \end{bmatrix} \begin{bmatrix} -\sin\phi \\ \cos\phi \end{bmatrix} \quad (4)$$

$$G = L_d L_q(\omega_{er}^2 - \omega_{dc}^2) + j\omega_{dc} R_a(L_d + L_q) + R_a^2$$

The function G is minimized when the number of revolutions ($\omega_{er}$) and the ripple frequency ($\omega_{dc}$) of the DC link voltage are equal. Hence, the largest amount of harmonic current flows when the number of revolutions satisfies $$\omega_{er} = \omega_{dc}.$$

<Beat Suppression Principle>

Next, consider minimizing the ripple component of an armature current Ia.

Since the armature currents Ia, Id and Iq satisfy $$Ia^2 = Id^2 + Iq^2,$$

Ia is minimized by minimizing the ripple component of each of Id and Iq. Here, focusing on the numerator of the frequency response function of Id and Iq, when the Vdc ripple frequency $\omega_{dc}$ and the inverter command frequency $\omega_{er}$ satisfy $$\omega_{dc} = \omega_{er},$$

the above Equation (1) is used to obtain $$\begin{bmatrix} I_d \\ I_q \end{bmatrix} = \frac{1}{G} \begin{bmatrix} R_a + j\omega_{dc}L_q & \omega_{er}L_q \\ -\omega_{er}L_d & R_a + j\omega_{dc}L_d \end{bmatrix} \begin{bmatrix} V_d \\ V_q \end{bmatrix}, \quad (5)$$

and focusing only on the numerator of Equation (5) and replacing $\omega_{dc}$ with $\omega_{er}$, the following equation is obtained.

$$\begin{bmatrix} I_d \\ I_q \end{bmatrix} = \begin{bmatrix} R_a V_d + \omega_{er} L_q (jV_d + V_q) \\ R_a V_q - \omega_{er} L_d (V_d - jV_q) \end{bmatrix} \quad (6)$$

Here, focusing only on Id, $jV_d + V_q$ in the second term on the right side of the equation of Id will be described below with reference to a vector diagram.

Figure 11A:
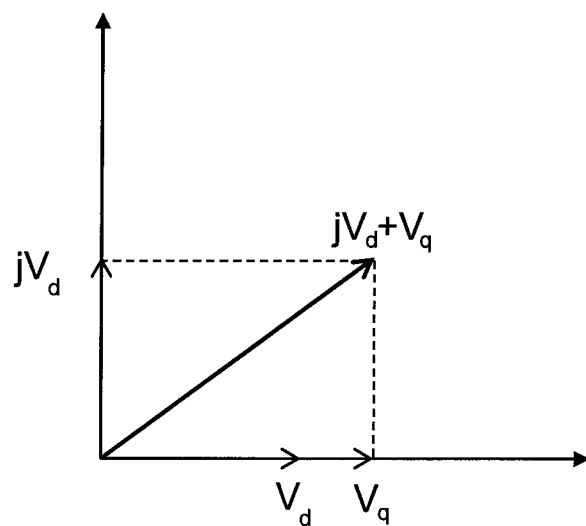
FIG. 11A is a vector locus when a phase difference θp between the Vd ripple and the Vq ripple is zero (θp=0).

If the phase difference θp between Vd and Vq is zero (θp=0), that is, Vd and Vq are in phase, the vector diagram is as illustrated in FIG. 11A, and the amplitude of the vector is the sum of both vectors.

Figure 11B:
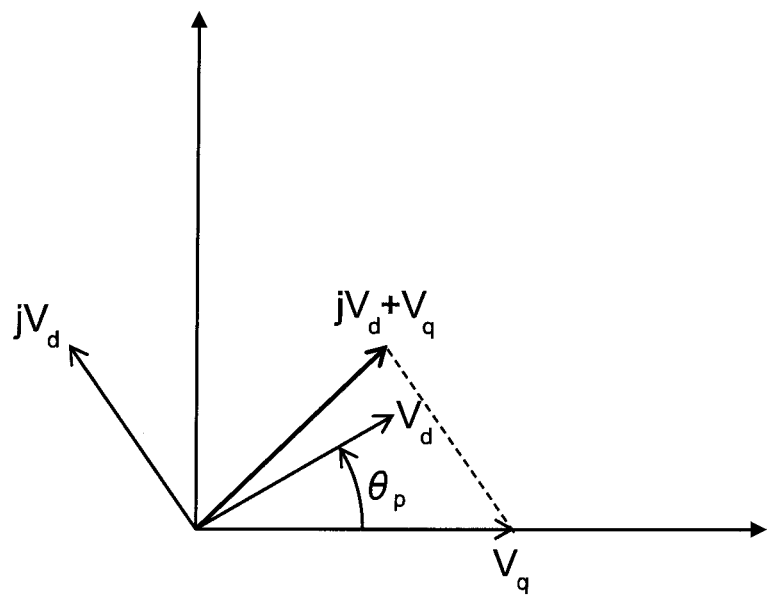
FIG. 11B is a vector locus when the phase difference θp between the Vd ripple and the Vq ripple is larger than zero (θp>0).

At this time, if θp is increased in the positive direction, the vector diagram changes as illustrated in FIG. 11B, and the magnitude of the resultant vector gradually decreases. Finally, when θp=90 degrees, the sum of vectors is canceled at Vd=Vq, and as a result, the ripple of Id is minimized.

Figure 11C:
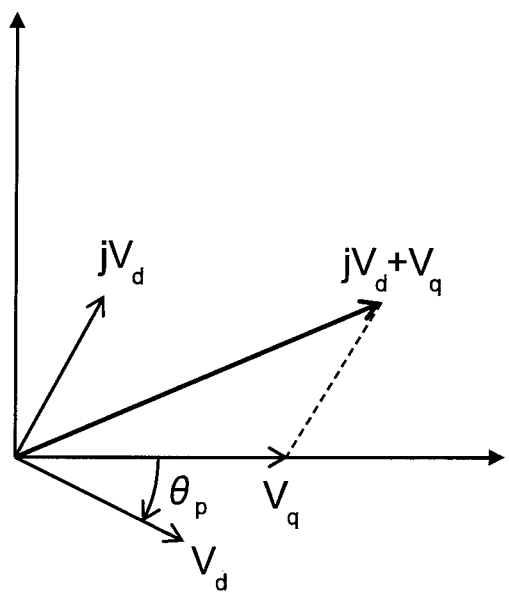
FIG. 11C is a vector locus when the phase difference θp between the Vd ripple and the Vq ripple is smaller than zero (θp<0).

On the other hand, when θp is reduced in the negative direction, the vector diagram changes as illustrated in FIG. 11C, and the resultant vector gradually increases to be maximized at θp=−90 degrees.

Figure 12:
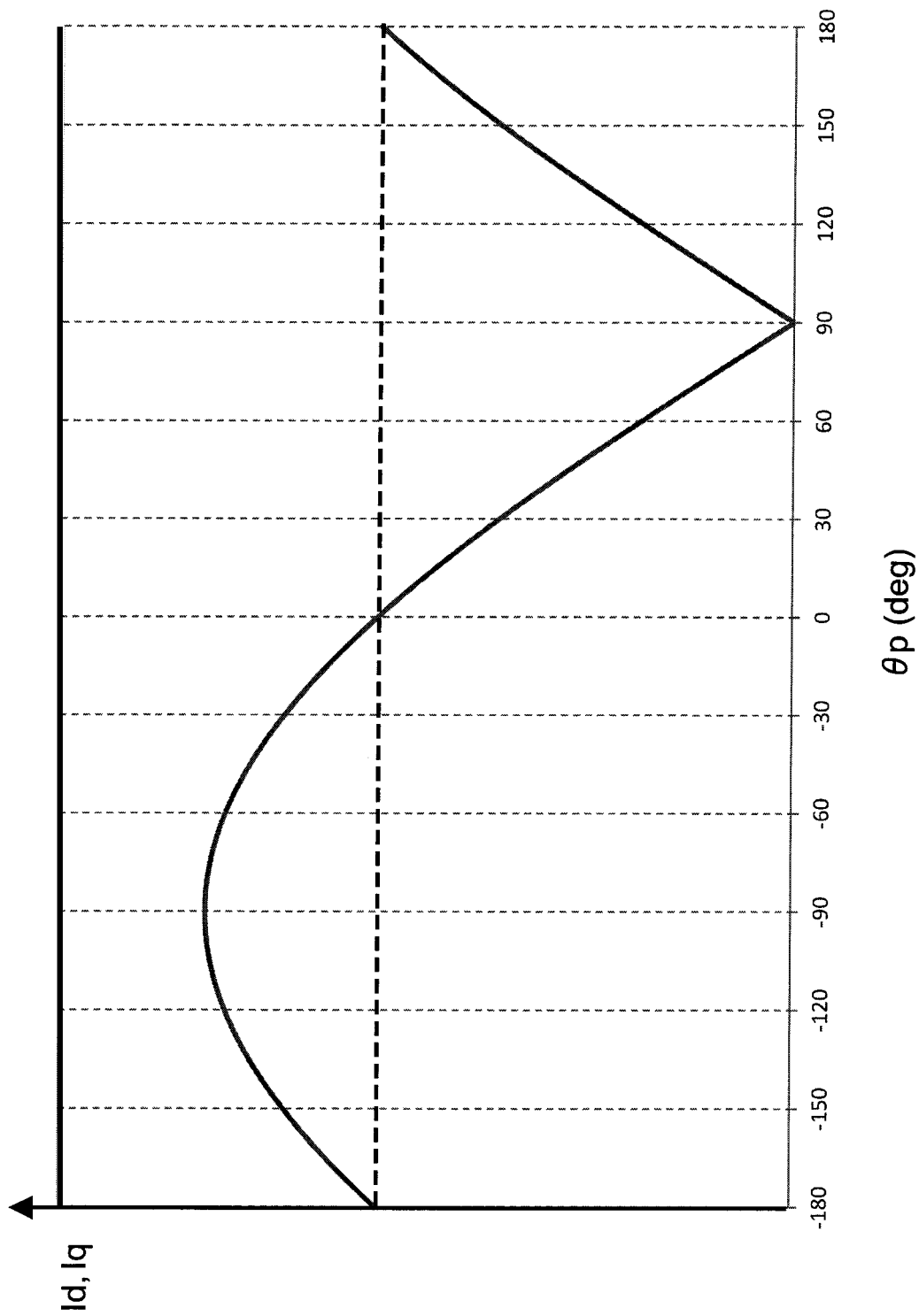
FIG. 12 is a diagram of a relationship between Id and Iq with respect to θp (when Vd=Vq).

From the above and the relationship between Id and Iq with respect to θp illustrated in FIG. 12 (when Vd=Vq), the effect of suppressing the beat current is exerted when the phase lead angle of Vd with respect to Vq is 0 to 180 degrees (Vd leads Vq).

Since the components of Vd and Vq are shifted by 90 degrees in the second term on the right side of Equation (6), it can be seen that Id and Iq also have components. Conversely, since Vd and Vq have the same amplitude, if Vd swings 90 degrees earlier than Vq, $$Vd = jVq.$$

Therefore, the above Equation (6) is expressed as $$\begin{bmatrix} I_d \\ I_q \end{bmatrix} = \begin{bmatrix} R_a V_d + \omega_{er} L_q (jV_d + V_q) \\ R_a V_q - \omega_{er} L_d (V_d - jV_q) \end{bmatrix}, \quad (7)$$

$$= \begin{bmatrix} R_a V_d + \omega_{er} L_q (jjV_q + V_q) \\ R_a V_q - \omega_{er} L_d (jV_q - jV_q) \end{bmatrix}$$

and eliminating the second term on the right side of Equation (7), the following equation is obtained.

$$\begin{bmatrix} I_d \\ I_q \end{bmatrix} = \begin{bmatrix} R_a V_d \\ R_a V_q \end{bmatrix} \quad (8)$$

In the above Equation (8), if $$R_a \ll \omega_{er} \times L_d$$

holds, Id and Iq are almost 0.

<How to Determine Compensation Phase>

Figure 5:
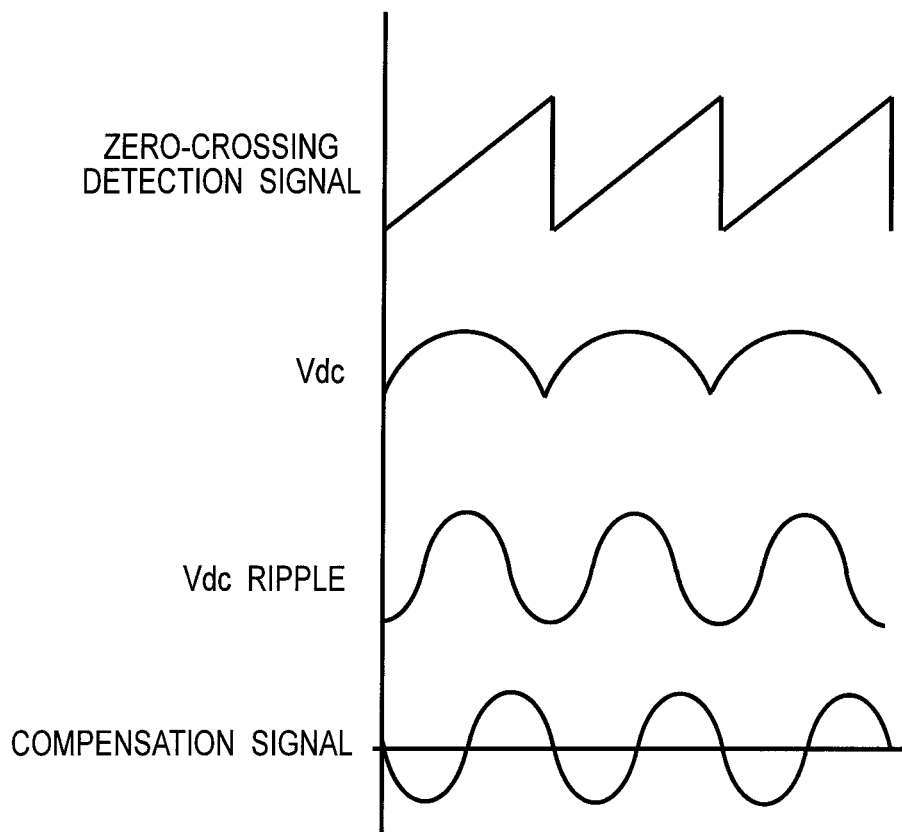
FIG. 5 is a diagram of waveforms of a zero-crossing detection signal, a DC link voltage, a ripple component of the DC link voltage, and a compensation signal.
Figure 6:
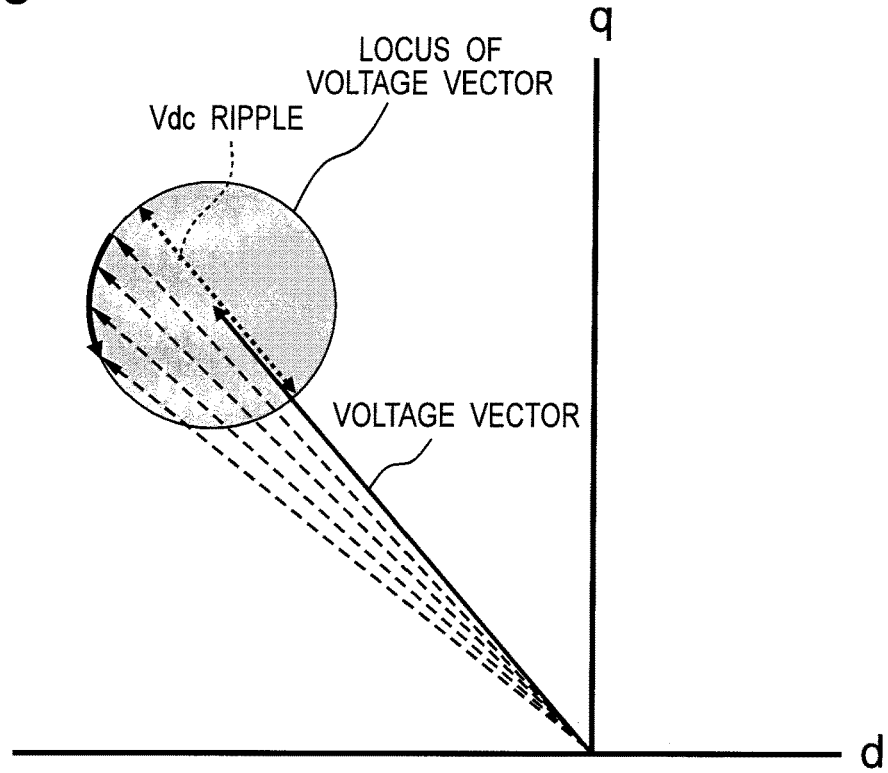
FIG. 6 is a diagram for describing a compensation phase of a voltage vector in a d and q coordinate system.
Figure 7:
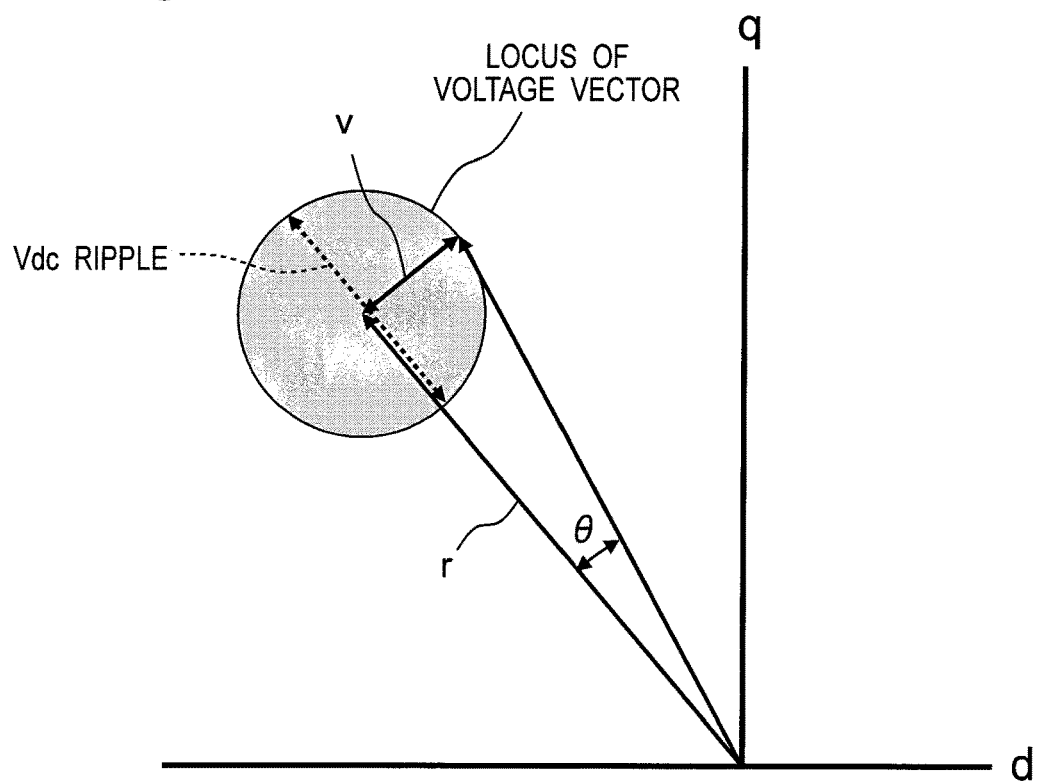
FIG. 7 is a diagram for describing a compensation gain of a voltage vector in the dq coordinate system.

FIG. 5 is a diagram of waveforms of a zero-crossing detection signal, a DC link voltage, a ripple component of the DC link voltage, and a compensation signal. As illustrated in FIG. 5, in the ripple component at 300 Hz, it suffices that Vd leads Vq by 90 degrees. Accordingly, the phase should be compensated so as to draw a counterclockwise circular locus as illustrated in the vector diagram of FIG. 6.

That is, taking the start position of the zero-crossing detection signal as a reference, it can be seen that it is sufficient to oscillate in −sin direction.

<How to Determine Compensation Gain>

Since it suffices that the locus of the voltage vector on the d and q axes is perfectly circular, such phase amplitude is obtained.

According to the equation of a circle, the voltage vector v is expressed as $$v = r\theta \quad (9)$$

Here, r is the average value $V_{dc\_ave}$ of the output voltage, and v is (maximum value $V_{dc\_max}$−average value $V_{dc\_ave}$) of the output voltage. If the modulation factor is around 1, $$\frac{v}{r} = \frac{V_{dc\_max} - V_{dc\_ave}}{V_{dc\_ave}}. \quad (10)$$

Therefore, the phase θ can be calculated by $$\theta = \frac{V_{dc\_max} - V_{dc\_ave}}{V_{dc\_ave}}. \quad (11)$$

Since gain=θ, the gain can be obtained from Equation (11)

According to the inverter device having the above configuration, in a rotating coordinate in which the N-pole direction of a permanent magnet embedded in a rotor of the motor 23 is taken as the d-axis and a direction orthogonal to the d-axis is taken as the q-axis, the control device 100 controls the inverter section 22 so that the the phase of d-axis voltage Vd of the ripple component included in the DC voltage from the converter section 21 leads the phase of the q-axis voltage Vq by 90 degrees, whereby it is possible to control the phase of the output voltage to the motor 23 according to ripple in the output voltage to the motor 23 without lowering voltage utilization factor, and it is possible to suppress ripple and beat in the motor current.

Further, based on the phase of the three-phase AC voltage detected by the zero-crossing detector 101 (phase detector), the Vdc ripple component phase detector 102 (ripple component phase determination unit) determines the phase of the ripple component included in the DC voltage. Hence, it is possible to detect the phase of the ripple component with a simple configuration. Based on the determined phase of the ripple component included in the DC voltage, the compensation signal generator 103 (output voltage phase correction unit) corrects the phase of the output voltage output from the inverter section so that the phase of the d-axis voltage Vd of the ripple component included in the DC voltage leads the phase of the q-axis voltage Vq by 90 degrees. Hence, it is possible to reliably suppress ripple and beat in the motor current.

In addition, by controlling the inverter section 22 by the control device 100 so that the locus of the voltage vector on the d and q axes of the rotating coordinate of the output voltage output from the inverter section 22 becomes circular, it is possible to reliably suppress ripple and beat in the motor current.

In addition, the characteristics of the LC filter are set so that the resonance frequency of the LC filter formed of the inductor Ldc and the capacitor Cdc is a frequency equal to or more than six times the commercial frequency of the three-phase AC voltage input into the converter section 21, and is a frequency that attenuates a current having the same frequency as the carrier frequency of the inverter section 22. Hence, a large capacitor and a large reactor for smoothing need not be provided in the DC link portion, whereby cost and size can be reduced.

Second Embodiment

The first embodiment describes the inverter device that compensates for the ripple component that is six times the power source frequency. However, in addition to the ripple component that is six times (in the case of three-phase AC voltage) the power source frequency, a DC link voltage actually includes harmonics that are multiples of the ripple component that is six times the power source frequency.

Therefore, the second embodiment of the invention describes an inverter device capable of suppressing, by a similar method, the influence of power ripple caused by such harmonics.

Figure 8:
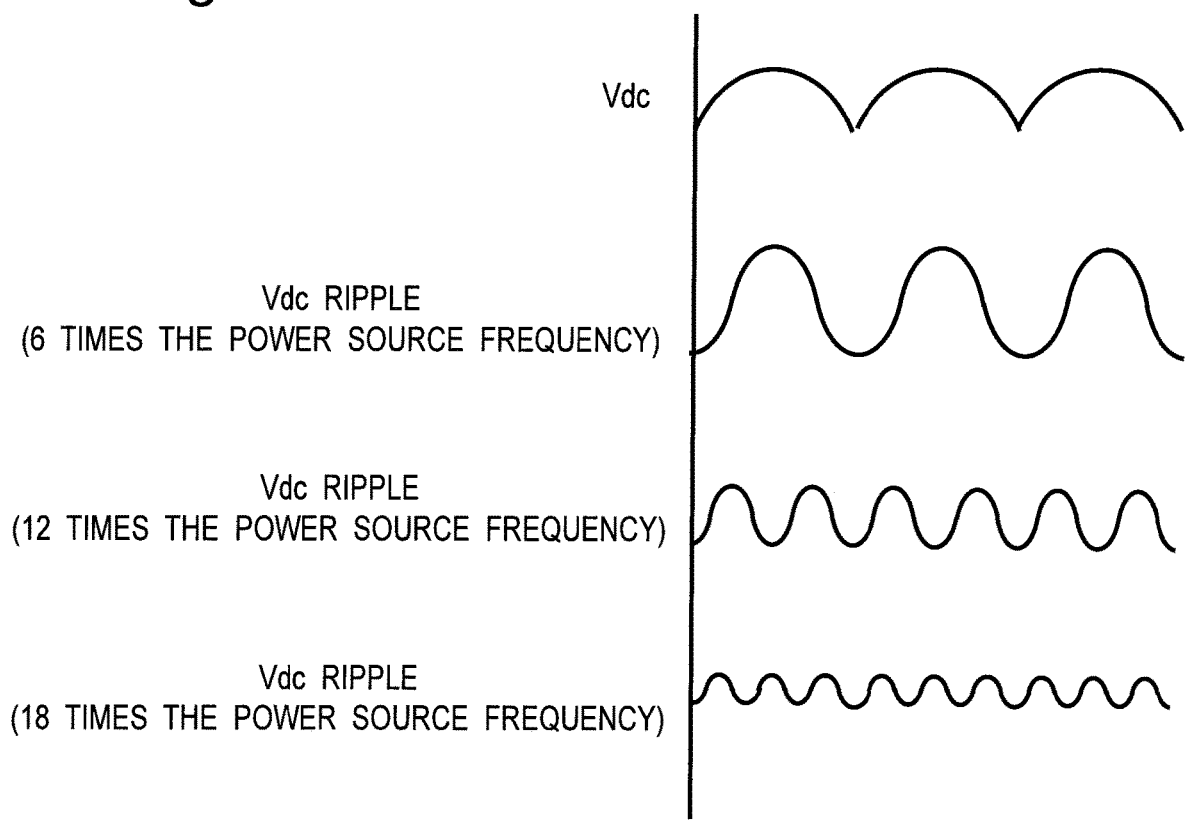
FIG. 8 is a diagram of waveforms of multiple Vdc ripples with different frequencies in an inverter device of a second embodiment of the invention.

As an example, considering a DC link voltage obtained by rectifying a three-phase AC voltage, as illustrated in FIG. 8, in addition to the ripple component that is six times the power source frequency, harmonics that are double, triple, . . . , N times (N is a positive integer) the ripple component that is six times the power source frequency are also included in the DC link voltage.

For these harmonics as well, current ripple can be suppressed by generating current ripple as in the case of the ripple having the frequency of six times the power source frequency, and injecting a compensation signal with the same principle.

Figure 9:
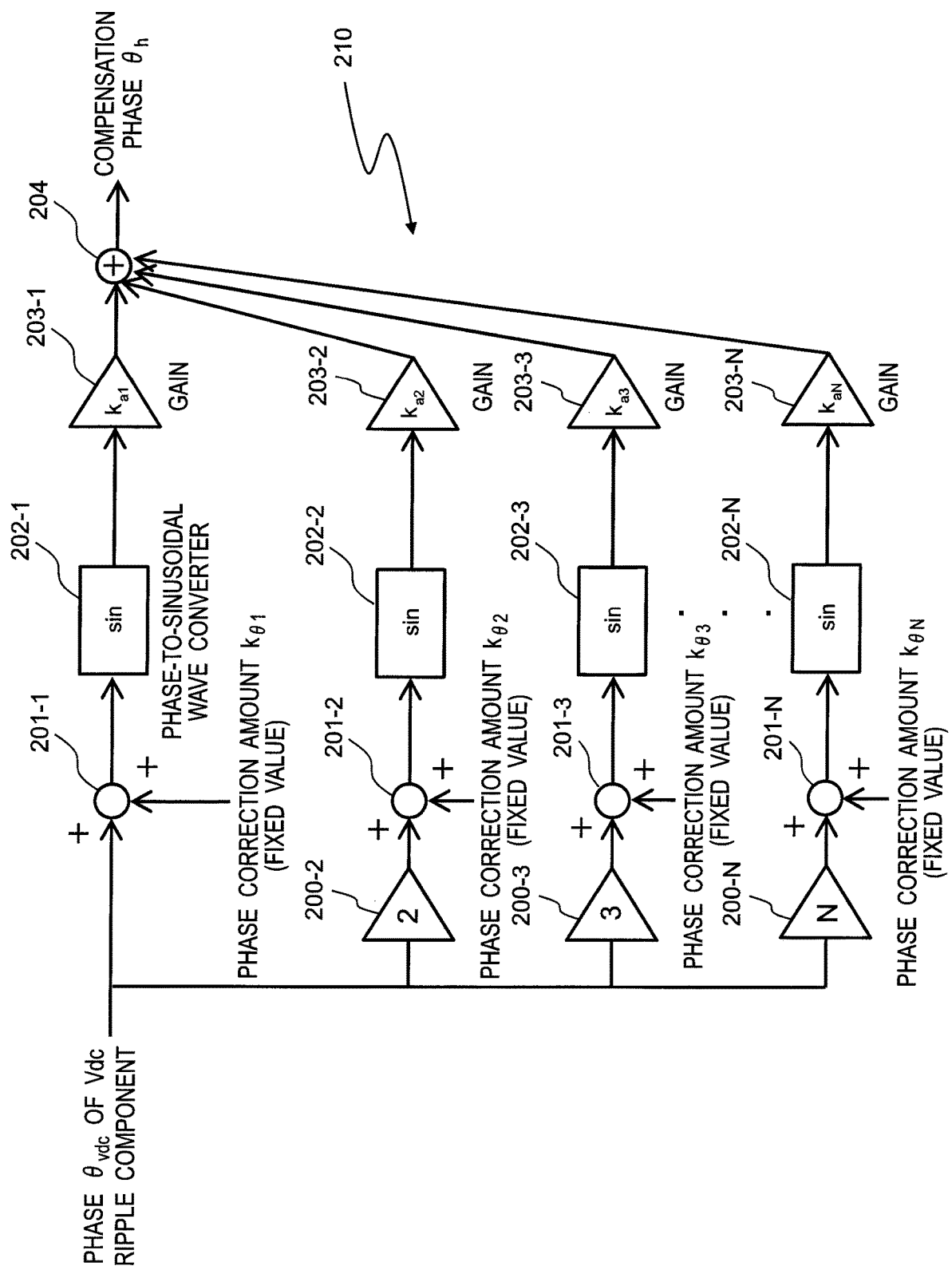
FIG. 9 is a configuration diagram of a compensation signal generator of the inverter device.

FIG. 9 is a configuration diagram of a compensation signal generator 210 of the inverter device of the second embodiment. Note that the inverter device of the second embodiment has the same configuration as that of the inverter device of the first embodiment except for the compensation signal generator 210, and therefore cites FIG. 1.

As illustrated in FIG. 9, the compensation signal generator 210 includes: an adder-subtractor 201-1 that adds a signal indicating a phase $\theta_{Vdc}$ of a Vdc ripple component from the Vdc ripple component phase detector 102 (illustrated in FIG. 1) and a phase correction amount $k_{\theta 1}$; a phase-to-sinusoidal wave converter 202-1 that converts the signal, to which the phase correction amount $k_{\theta 1}$ is added by the adder-subtractor 201-1, into a sine wave; and a multiplication device 203-1 that corrects the gain of the compensation signal from the phase-to-sinusoidal wave converter 202-1 and outputs a compensation signal $\theta_{h1}$.

The adder-subtractor 201-1, the phase-to-sinusoidal wave converter 202-1, and the multiplication device 203-1 form a first output voltage phase correction unit.

The compensation signal generator 210 also includes: multipliers 200-2, 200-3, . . . , 200-N that respectively multiply signals indicating the phase $\theta_{Vdc}$ of the Vdc ripple component from the Vdc ripple component phase detector 102 by 2, 3, . . . , N; adder-subtractors 201-2, 201-3, . . . , 201-N that respectively add the signals from the multipliers 200-2, 200-3, . . . , 200-N and phase correction amounts $k_{\theta 2}$, $k_{\theta 3}$, . . . , $k_{\theta N}$; phase-to-sinusoidal wave converters 202-2, 202-3, . . . , 202-N that respectively convert the signals, to which the phase correction amounts $k_{\theta 2}$, $k_{\theta 3}$, . . . , $k_{\theta N}$ are added by the adder-subtractors 201-2, 201-3, . . . , 201-N, into sine waves; and multiplication devices 203-2, 203-3, . . . , 203-N that correct respective gains of the compensation signals from the phase-to-sinusoidal wave converters 202-2, 202-3, . . . , 202-N and output compensation signals $\theta_{h2}$, $\theta_{h3}$, . . . , $\theta_{hN}$.

Here, gain correction amounts $k_1$, $k_2$, $k_3$, . . . , $k_N$ of the multiplication devices 203-1, 203-2, 203-3, . . . , 203-N are fixed values.

The multipliers 200-2, 200-3, . . . , 200-N, the adder-subtractors 201-2, 201-3, . . . , 201-N, the phase-to-sinusoidal wave converters 202-2, 202-3, . . . , 202-N, and the multiplication devices 203-2, 203-3, . . . , 203-N form second to Nth output voltage phase correction units.

The compensation signal generator 210 also includes an adder-subtractor 204 that adds the compensation signals $\theta_{h1}$, $\theta_{h2}$, $\theta_{h3}$, . . . , $\theta_{hN}$ from the multiplication devices 203-1, 203-2, 203-3, . . . , 203-N and outputs a compensation signal $\theta_h$.

According to the inverter device having the above configuration, it is possible to suppress ripple and beat in the motor current not only for the ripple component having a frequency six times the frequency of the three-phase AC voltage, but also for harmonic components of integral multiples of the ripple component having the sextuple frequency, by controlling the phase of the output voltage output from an inverter section 22 so that the phase of the d-axis voltage Vd of the harmonic component of the integral multiple of the ripple component having the sextuple frequency leads the phase of the q-axis voltage Vq by 90 degrees, in a rotating coordinate in which a direction orthogonal to the d-axis is taken as the q-axis.

The inverter device of the second embodiment has effects similar to those of the inverter device of the first embodiment.

Third Embodiment

In the first and second embodiments, the characteristics of the LC filter are set so that the resonance frequency of the LC filter may be a frequency equal to or more than six times the commercial frequency of the three-phase AC voltage input into the converter section 21, and may be a frequency that attenuates a current having the same frequency as the carrier frequency of the inverter section 22. However, the LC filter is not limited thereto.

An inverter device of the third embodiment of the invention adopts an LC filter having a resonance frequency of less than six times the commercial frequency of the three-phase AC voltage input into the converter section 21.

The inverter device of the third embodiment has effects similar to those of the inverter device of the first embodiment.

Although specific embodiments of the invention have been described, the invention is not limited to the above-described first to third embodiments, and various modifications can be made within the scope of the invention. For example, an appropriate combination of contents described in the first to third embodiments may be one embodiment of the invention.

The invention claimed is:

1. An inverter device comprising:
   a converter section that
      full-wave rectifies a three-phase AC voltage, and
      outputs a DC voltage including a ripple component having a frequency six times a frequency of the three-phase AC voltage;
   an inverter section that
      converts the DC voltage including the ripple component from the converter section into an AC voltage, and
      outputs the AC voltage to a motor; and
   a control device that, in a rotating coordinate in which an N-pole direction of a permanent magnet embedded in a rotor of the motor is taken as a d-axis and a direction orthogonal to the d-axis is taken as a q-axis, controls the inverter section so that a phase of a d-axis voltage Vd of the ripple component included in the DC voltage leads a phase of a q-axis voltage Vq.

2. The inverter device according to claim 1, wherein the control device controls the inverter section so that the phase of d-axis voltage Vd of the ripple component included in the DC voltage leads the phase of the q-axis voltage Vq by 90 degrees in the rotating coordinate.

3. The inverter device according to claim 2, wherein the control device includes
   a phase detector that detects a phase of the three-phase AC voltage,
   a ripple component phase determination unit that determines a phase of the ripple component included in the DC voltage based on the phase of the three-phase AC voltage detected by the phase detector, and
   an output voltage phase correction unit that corrects a phase of an output voltage output from the inverter section based on the phase of the ripple component included in the DC voltage determined by the ripple component phase determination unit, so that the phase of the d-axis voltage Vd of the ripple component included in the DC voltage leads the phase of the q-axis voltage Vq by 90 degrees.

4. The inverter device according to claim 2, wherein the control device controls the inverter section so that a locus of a voltage vector on the d and q axes of the rotating coordinate of an output voltage output from the inverter section becomes circular.

5. The inverter device according to claim 2, further comprising:
   an LC filter that has
      a reactor connected to one of two output ends of the converter section and one of two input ends of the inverter section, and
      a capacitor connected between the input ends of the inverter section,
   a characteristic of the LC filter is set so that a resonance frequency of the LC filter
      is a frequency equal to or more than six times a commercial frequency of the three-phase AC voltage input into the converter section, and
      is a frequency that attenuates a current having a same frequency as a carrier frequency of the inverter section.

6. The inverter device according to claim 1, wherein the control device includes
   a phase detector that detects a phase of the three-phase AC voltage,
   a ripple component phase determination unit that determines a phase of the ripple component included in the DC voltage based on the phase of the three-phase AC voltage detected by the phase detector, and
   an output voltage phase correction unit that corrects a phase of an output voltage output from the inverter section based on the phase of the ripple component included in the DC voltage determined by the ripple component phase determination unit, so that the phase of the d-axis voltage Vd of the ripple component included in the DC voltage leads the phase of the q-axis voltage Vq by 90 degrees.

7. The inverter device according to claim 6, wherein the output voltage phase correction unit includes
   a first output voltage phase correction unit that corrects a phase of an output voltage output from the inverter section so that the phase of the d-axis voltage Vd of the ripple component having the frequency six times the frequency of the three-phase AC voltage leads the phase of the q-axis voltage Vq by 90 degrees, and
   second to Nth output voltage phase correction units that correct respective phases of the output voltage output from the inverter section so that the phase of the d-axis voltage Vd of the ripple component having a frequency of 6N times the frequency of the three-phase AC voltage leads the phase of the q-axis voltage Vq by 90 degrees, where N=2, 3, . . . m, and m is a positive integer.

8. The inverter device according to claim 6, wherein the control device controls the inverter section so that a locus of a voltage vector on the d and q axes of the rotating coordinate of an output voltage output from the inverter section becomes circular.

9. The inverter device according to claim 6, further comprising:
   an LC filter that has
      a reactor connected to one of two output ends of the converter section and one of two input ends of the inverter section, and
      a capacitor connected between the input ends of the inverter section,
   a characteristic of the LC filter is set so that a resonance frequency of the LC filter
      is a frequency equal to or more than six times a commercial frequency of the three-phase AC voltage input into the converter section, and
      is a frequency that attenuates a current having a same frequency as a carrier frequency of the inverter section.

10. The inverter device according to claim 1, wherein
the control device controls the inverter section so that a locus of a voltage vector on the d and q axes of the rotating coordinate of an output voltage output from the inverter section becomes circular.

11. The inverter device according to claim 10, further comprising:
an LC filter that has
a reactor connected to one of two output ends of the converter section and one of two input ends of the inverter section, and
a capacitor connected between the input ends of the inverter section,
a characteristic of the LC filter is set so that a resonance frequency of the LC filter
is a frequency equal to or more than six times a commercial frequency of the three-phase AC voltage input into the converter section, and
is a frequency that attenuates a current having a same frequency as a carrier frequency of the inverter section.

12. The inverter device according to claim 1, further comprising:
an LC filter that has
a reactor connected to one of two output ends of the converter section and one of two input ends of the inverter section, and
a capacitor connected between the input ends of the inverter section,
a characteristic of the LC filter is set so that a resonance frequency of the LC filter
is a frequency equal to or more than six times a commercial frequency of the three-phase AC voltage input into the converter section, and
is a frequency that attenuates a current having a same frequency as a carrier frequency of the inverter section.

* * * * *